(12) United States Patent
Kimura et al.

(10) Patent No.: US 9,187,052 B2
(45) Date of Patent: Nov. 17, 2015

(54) VEHICLE

(75) Inventors: Kenji Kimura, Miyoshi (JP); Tsuyoshi Hayashi, Miyoshi (JP); Nobuyoshi Fujiwara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/344,138

(22) PCT Filed: Nov. 16, 2011

(86) PCT No.: PCT/JP2011/006379
§ 371 (c)(1),
(2), (4) Date: Mar. 11, 2014

(87) PCT Pub. No.: WO2013/072962
PCT Pub. Date: May 23, 2013

(65) Prior Publication Data
US 2014/0345961 A1    Nov. 27, 2014

(51) Int. Cl.
*B60R 16/04* (2006.01)
*B60K 1/04* (2006.01)
(Continued)

(52) U.S. Cl.
CPC . *B60R 16/04* (2013.01); *B60K 1/04* (2013.01); *B60L 1/003* (2013.01); *B60L 1/02* (2013.01); *B60L 3/0046* (2013.01); *B60L 3/12* (2013.01); *B60L 11/005* (2013.01); *B60L 11/14* (2013.01); *B60L 11/1864* (2013.01); *B60L 11/1874* (2013.01); *B60L 11/1877* (2013.01);
(Continued)

(58) Field of Classification Search
CPC .... B60K 1/04; B60K 1/00; B60K 2001/0427; B60K 2001/0455; B60L 11/14; B60L 11/1877; B60L 2210/10; B60L 2250/16; B60L 11/005; B60L 11/1864; B60L 11/1874; B60L 2210/14; B60L 2210/04; B60L 2240/34; B60L 2240/80; B60L 1/003; B60L 1/02; B60L 3/0046; B60L 3/12; B60R 16/04; B60R 16/0231; Y02T 10/7005; Y02T 10/7077; Y02T 10/7241; Y02T 10/7022; Y02T 10/7225; Y02T 10/7061; Y02T 10/70
USPC ....................................... 180/68.1, 68.2, 68.5
See application file for complete search history.

(56) References Cited

U.S. PATENT DOCUMENTS 5,392,873 A * 2/1995 Masuyama et al. .......... 180/68.5
5,490,572 A * 2/1996 Tajiri et al. ................... 180/65.1
(Continued)

FOREIGN PATENT DOCUMENTS

JP    A-2004-90693    3/2004
JP    A-2004-237803   8/2004
(Continued)

*Primary Examiner* — Hau Phan
*Assistant Examiner* — Jacob Meyer
(74) *Attorney, Agent, or Firm* — Oliff PLC

(57) ABSTRACT

A vehicle 100 according to the present invention includes a battery pack 2, wherein the battery pack is disposed, in the vehicle, forward Fr of a space S2 formed between a driver's seat 11 and a passenger's seat 12 provided side by side in a vehicle width direction, and rearward Rr of an instrument panel 31 provided forward of the driver's seat 11 and the passenger's seat 12 in the interior of the vehicle. According to the present invention, it is unnecessary to remove the driver's seat and the passenger's seat in removing the battery pack from the vehicle body, and the number of man-hours involved in the removal work of the battery pack can be reduced as compared with the conventional vehicle.

3 Claims, 4 Drawing Sheets

(51) Int. Cl.
  *B60L 11/18* (2006.01)
  *B60L 1/00* (2006.01)
  *B60L 1/02* (2006.01)
  *B60L 3/00* (2006.01)
  *B60L 3/12* (2006.01)
  *B60L 11/00* (2006.01)
  *B60L 11/14* (2006.01)
  *B60R 16/023* (2006.01)

(52) U.S. Cl.
  CPC ..... *B60R16/0231* (2013.01); *B60K 2001/0427* (2013.01); *B60K 2001/0455* (2013.01); *B60L 2210/14* (2013.01); *B60L 2210/40* (2013.01); *B60L 2240/34* (2013.01); *B60L 2240/80* (2013.01); *Y02T 10/70* (2013.01); *Y02T 10/7005* (2013.01); *Y02T 10/7022* (2013.01); *Y02T 10/7061* (2013.01); *Y02T 10/7077* (2013.01); *Y02T 10/7225* (2013.01); *Y02T 10/7241* (2013.01)

(56) References Cited

U.S. PATENT DOCUMENTS

| | | | |
|---|---|---|---|
| 5,641,031 A * | 6/1997 | Riemer et al. | 429/423 |
| 6,094,927 A * | 8/2000 | Anazawa et al. | 62/239 |
| 6,119,060 A * | 9/2000 | Takayama et al. | 701/36 |
| 6,705,672 B2 * | 3/2004 | Shikata et al. | 296/208 |
| 6,811,197 B1 * | 11/2004 | Grabowski et al. | 296/37.8 |
| 6,902,020 B2 | 6/2005 | Kronner et al. | 180/68.5 |
| 7,079,379 B2 * | 7/2006 | Yamaguchi et al. | 361/676 |
| 7,419,209 B1 * | 9/2008 | Mangiapane et al. | 296/208 |
| 7,424,926 B2 * | 9/2008 | Tsuchiya | 180/68.5 |
| 7,631,711 B2 * | 12/2009 | Kubo | 180/68.1 |
| 7,654,351 B2 * | 2/2010 | Koike et al. | 180/68.5 |
| 7,810,596 B2 * | 10/2010 | Tsuchiya | 180/68.5 |
| 8,479,858 B2 * | 7/2013 | Kodaira | 180/68.5 |
| 2001/0030069 A1 * | 10/2001 | Misu et al. | 180/68.1 |
| 2004/0232672 A1 * | 11/2004 | Bandoh et al. | 280/735 |
| 2006/0073378 A1 * | 4/2006 | Hamery et al. | 429/120 |
| 2006/0087582 A1 * | 4/2006 | Scharenbroch et al. | 348/370 |
| 2006/0096797 A1 * | 5/2006 | Tsuchiya | 180/68.5 |
| 2007/0289789 A1 * | 12/2007 | Tsuchiya | 180/68.2 |
| 2007/0292752 A1 * | 12/2007 | Tsuchiya | 429/120 |
| 2008/0047767 A1 * | 2/2008 | Tsuchiya | 180/68.5 |
| 2008/0164081 A1 * | 7/2008 | Watanabe et al. | 180/65.2 |
| 2009/0183935 A1 * | 7/2009 | Tsuchiya | 180/68.1 |
| 2010/0055553 A1 * | 3/2010 | Kimura | 429/120 |
| 2010/0231035 A1 * | 9/2010 | Tsuchiya et al. | 307/9.1 |
| 2011/0132676 A1 * | 6/2011 | Kodaira | 180/65.51 |
| 2012/0118653 A1 * | 5/2012 | Ogihara et al. | 180/65.8 |
| 2013/0140101 A1 * | 6/2013 | Lim et al. | 180/68.5 |

FOREIGN PATENT DOCUMENTS

| | | |
|---|---|---|
| JP | A-2004-255892 | 9/2004 |
| JP | A-2004-345447 | 12/2004 |
| JP | A-2008-1147 | 1/2008 |
| JP | 2008-149765 A | 7/2008 |
| JP | 2008-260374 A | 10/2008 |
| JP | 2011-025812 A | 2/2011 |
| JP | A-2011-79411 | 4/2011 |
| JP | 2011-193546 A | 9/2011 |
| WO | WO 2004/070860 A1 | 8/2004 |
| WO | 2007/105430 A2 | 9/2007 |
| WO | 2011-013717 A1 | 2/2011 |

* cited by examiner

VEHICLE

TECHNICAL FIELD

The present invention relates to a vehicle on which a battery pack is mounted.

BACKGROUND ART

Vehicles such as an electric car and a hybrid car have a battery pack mounted thereon to drive an electric motor, and the battery pack contains a battery formed of a lithium-ion battery or a nickel metal hydride battery (see, for example, Patent Document 1).

In Patent Document 1, the battery pack is disposed on a floor panel and between a driver's seat and a passenger's seat placed side by side in a vehicle width direction.

PRIOR ART DOCUMENT

Patent Document

[Patent Document 1] Japanese Patent Laid-Open No. 2004-345447

DISCLOSURE OF THE INVENTION

Problems to be Solved by the Invention

Patent Document 1, however, has a problem in which the placement of the battery pack between the driver's seat and the passenger's seat requires the removal of the driver's seat and the passenger's seat in the removal work of the battery pack performed for replacing the battery or discarding the vehicle, so that a large number of man-hours are involved.

It is an object of the present invention to provide a vehicle in which the number of man-hours involved in the removal work of a battery pack can be reduced.

Means for Solving the Problems

To solve the above problem, the present invention provides (1) a vehicle including a battery pack, wherein the battery pack is disposed, in the vehicle, forward of a space formed between a driver's seat and a passenger's seat placed side by side in a vehicle width direction, and rearward of an instrument panel provided forward of the driver's seat and the passenger's seat in the interior of the vehicle.

According to the present invention, since the battery pack is disposed forward of the space between the driver's seat and the passenger's seat and rearward of the instrument panel in the vehicle, it is unnecessary to remove the driver's seat and the passenger's seat in removing the battery pack from the vehicle body, and accordingly, the number of man-hours involved in the removal work of the battery pack can be reduced as compared with the conventional battery.

(2) In the configuration of (1) described above, the driver's seat and the passenger's seat may be slidably moved in a vehicle front-rear direction and a direction orthogonal to the vehicle width direction, and a rear end portion of the battery pack in the vehicle front-rear direction may be disposed forward of a front end portion in the vehicle front-rear direction of at least one of the driver's seat and the passenger's seat located at the most rearward positions of motion ranges.

According to the present invention, at least one of the driver's seat and the passenger's seat can be moved to the most rearward positions of the motion ranges in replacement of the battery pack to locate the at least one of the driver's seat and the passenger's seat at the positions where they are not overlapped with the battery pack when they are viewed from the vehicle width direction. This can facilitate the removal operation of the battery pack.

(3) In the configuration of (1) or (2) described above, the battery pack may have an intake opening portion at a front end portion in the vehicle front-rear direction, and the intake opening portion may take in cooling air for cooling the inside of the battery pack into the battery pack.

Typically, a cooling/heating air conditioner is disposed below the instrument panel, and during air conditioning, the cooling/heating air conditioner sends cool air toward occupants sitting in the driver's seat and the passenger's seat, that is, to near the instrument panel. Thus, air at a temperature lower than the ambient temperature stays near the instrument panel.

According to the present invention, since the intake opening portion is provided at the front of the battery pack, the air at the lower temperature staying near the instrument panel can be favorably taken into the battery pack through the intake opening portion to cool the battery sufficiently.

(4) In the configuration of (1) or (2) described above, the battery pack may accommodate a battery including a plurality of cells connected to each other, an electric device involved in control of a power supplied to a load from the battery may be mounted forward of the instrument panel in the vehicle front-rear direction, and a connecting portion for connecting the battery to the electric device may be disposed within the battery pack and forward of the battery in the vehicle front-rear direction.

According to the present invention, since the connecting portion is disposed within the battery pack and forward of the battery, a cable coupling the electric device to the connecting portion can be shortened as compared with the case where the connecting portion is disposed at the back of the battery.

(5) In the configuration of any one of (1) to (4) described above, a control panel portion may extend from the instrument panel to the space formed between the driver's seat and the passenger's seat, and the battery pack may be disposed on a floor panel and below the control panel portion.

According to the present invention, the space between the control panel portion and the floor panel can be effectively used.

MODE FOR CARRYING OUT THE INVENTION

An embodiment according to the present invention will hereinafter be described with reference to the drawings.

Figure 1:
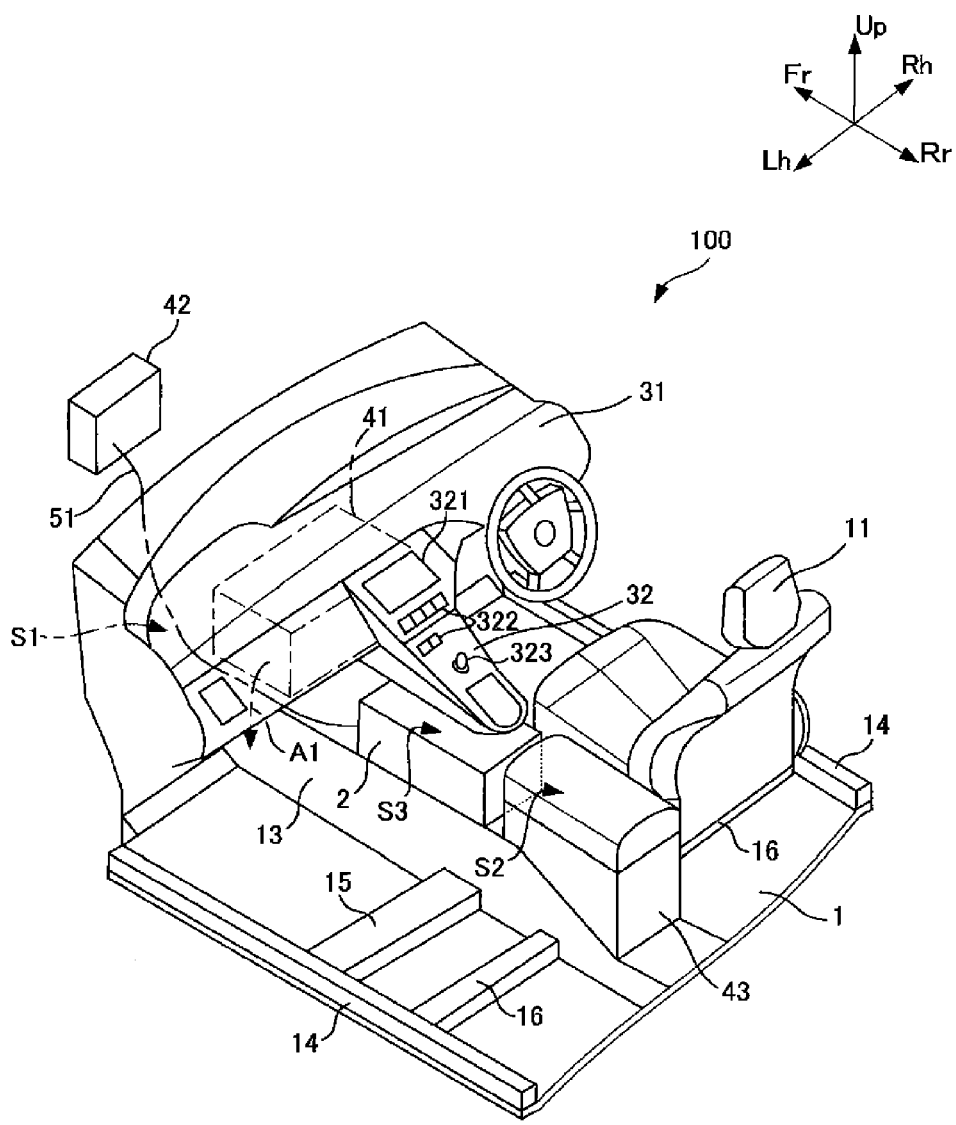
FIG. 1 is a perspective view showing the main portions of the interior of a car.

FIG. 1 is a perspective view showing the main portions of the interior of a vehicle 100. In FIG. 1, an arrow Fr indicates a front direction of a vehicle front-rear direction, and an arrow Rr indicates a rear direction, an arrow Rh indicates a right direction relative to the front direction, an arrow Lh indicates a left direction relative to the front direction, and an Up direction indicates an upward direction. In the following, the front direction of the vehicle front-rear direction is referred to simply as forward, and the rear direction of the vehicle front-rear direction is referred to simply as rearward. The direction of the arrow Rh and the direction of the arrow Lh are referred to as a vehicle width direction.

In the vehicle 100, a battery 21 is housed in a battery pack 2 as described later. The vehicle 100 is a hybrid car having a drive system which drives a motor for running of the vehicle using the power of the battery 21 and a drive system formed of an internal-combustion engine. The vehicle 100 may be a plug-in hybrid car in which the battery 21 can be charged with a commercial power source provided outside. The vehicle 100 may be an electric car having only the drive system which drives the motor using the power of the battery 21.

In the interior of the vehicle 100, a driver's seat 11 serving as a first seat is provided on a floor panel 1. Although not shown in FIG. 1, a passenger's seat 12 serving as the first seat is provided on the left of the driver's seat 11.

On the floor panel 1, a floor tunnel 13 is provided between the driver's seat 11 and the passenger's seat 12. The floor tunnel 13 protrudes upward from the floor panel 1 and extends in the vehicle front-rear direction. The floor tunnel 13 accommodates a propeller shaft and exhaust pipes extending in the vehicle front-rear direction and has the function of lowering the floor surface. On the floor panel 1, side members 14 serving as a frame member of the vehicle 100 are provided on both ends in the vehicle width direction. The side member 14 extends in the vehicle front-rear direction and has a cross section orthogonal to the vehicle front-rear direction formed as a closed surface.

Cross members 15 and 16 extending in the vehicle width direction are provided on the floor panel 1. Each of the cross members 15 and 16 is a frame member of the vehicle 100 and has a cross section orthogonal to the vehicle width direction formed as a closed surface. Each of the cross members 15 and 16 intersects the floor tunnel 13, and is bonded, at both ends, to the side members 14 provided on both sides in the vehicle width direction. The cross members 15 and 16 are bonded to the floor tunnel 13 at the intersections with the floor tunnel 13.

In the interior of the car, an instrument panel 31 made of resin or the like and extending in the vehicle width direction from the front of the driver's seat 11 to the front of the passenger's seat 12 is provided at the front and under a front window. The instrument panel 31 refers to the interior parts as a whole provided from the front of the driver's seat 11 to the front of the passenger's seat 12. In the following, the instrument panel 31 is abbreviated as the in-pane 31.

A control panel portion 32 extending rearward is provided at the center of the in-pane 31 in the vehicle width direction. The control panel portion 32 is provided with a touch panel 321, buttons 322, and a shift lever 323. An occupant can manipulate the touch panel 321 and the buttons 322 to operate various auxiliaries such as an air-conditioner installed on the vehicle 100.

A Heating, Ventilation, and Air Conditioning (HVAC) 41 serving as a cooling/heating air conditioner is provided in an internal space S1 of the in-pane 31 that is covered with the in-pane 31 in the interior of the car. The HVAC 41 sends air for ventilation, low-temperature air, and high-temperature air to respective portions in the interior of the car. For example, the HVAC 41 sends low-temperature air A1 toward occupants sitting in the driver's seat 11 and the passenger's seat.

An engine compartment is disposed at the front of the vehicle 100 and is separated from the interior of the car by a member such as a dash panel, not shown. The engine compartment accommodates an engine and a motor. The engine compartment also accommodates a power control unit 42 as an electric device used in controlling the power supplied to a load such as the motor from the battery 21. The power control unit 42 is electrically coupled to the battery in the battery pack 2 through a power cable 51. The power control unit 42 includes an inverter for increasing the voltage of the battery, an inverter for converting a DC voltage to an AC voltage, and an Electric Control Unit (ECU) for controlling the step-up converter and the inverter.

In the vehicle 100 described above, the battery pack 2 is disposed forward of a space S2 between the driver's seat 11 and the passenger's seat 12 and rearward of the in-pane 31. For example, the battery pack 2 is disposed in a space S3 on the floor tunnel 13 and below the control panel portion 32. A center console box 43 made of resin and capable of housing small articles is disposed rearward of the battery pack 2.

Figure 2:
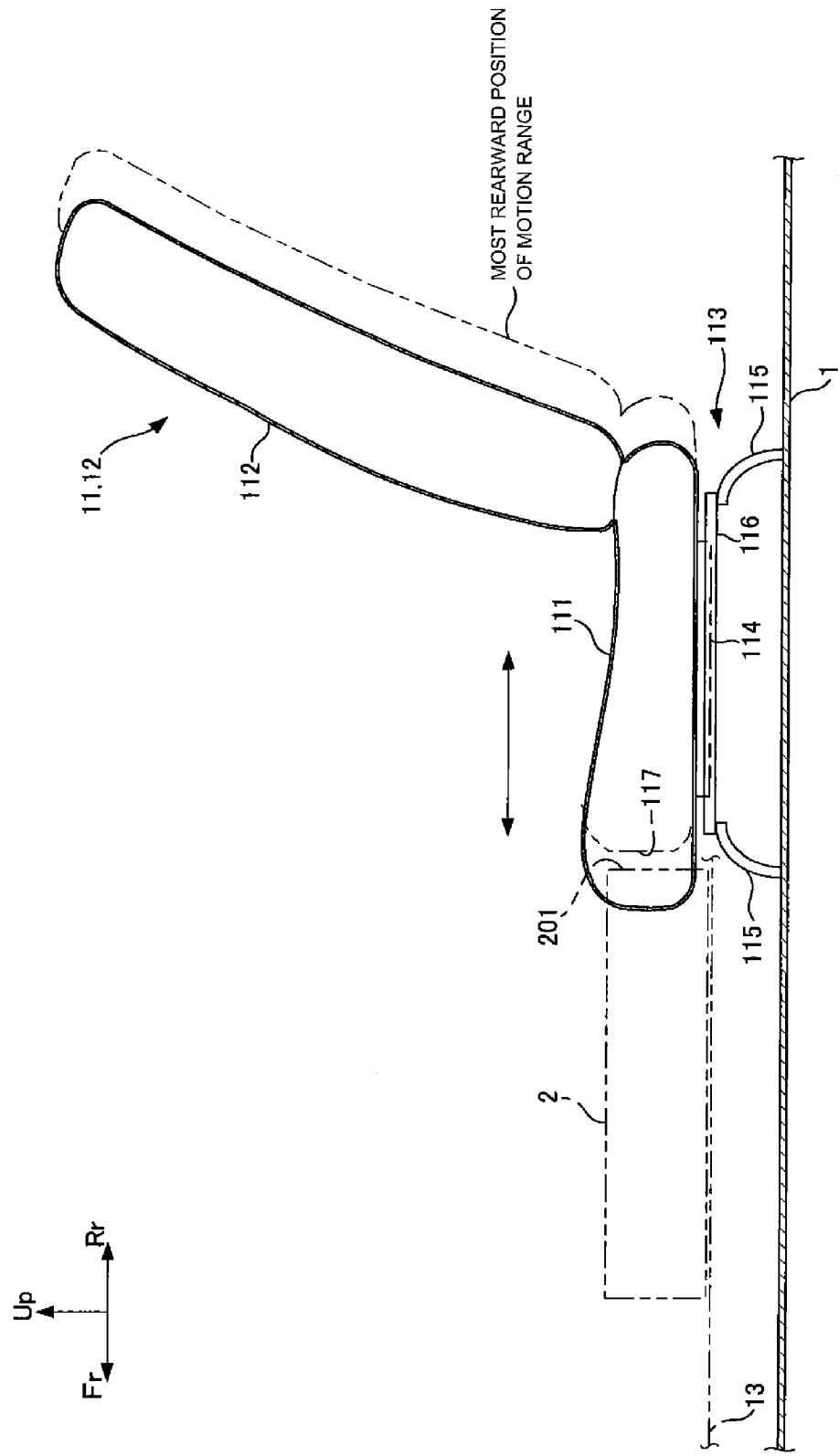
FIG. 2 is a side view showing the configuration of a driver's seat.

FIG. 2 is a side view showing the configuration of the driver's seat 11.

The driver's seat 11 includes a cushion seat 111, a seat back 112 pivotable about its lower end portion, and a slide mechanism 113. A pair of slide mechanisms 113 is provided for the cushion seat 111 in the vehicle width direction.

The slide mechanism 113 includes a rail portion 114 protruding downward from the cushion seat 111, a pair of seat legs 115 provided on the floor panel 1, and a guide portion 116 supported on the seat legs 115 and guiding the rail portion 114 in the front-rear direction. The slide mechanism 113 supports the cushion seat 111 and the seat back 112 and slides them in the Fr direction and the Rr direction relative to the floor panel 1 (and in a direction orthogonal to the vehicle width direction).

Figure 3:
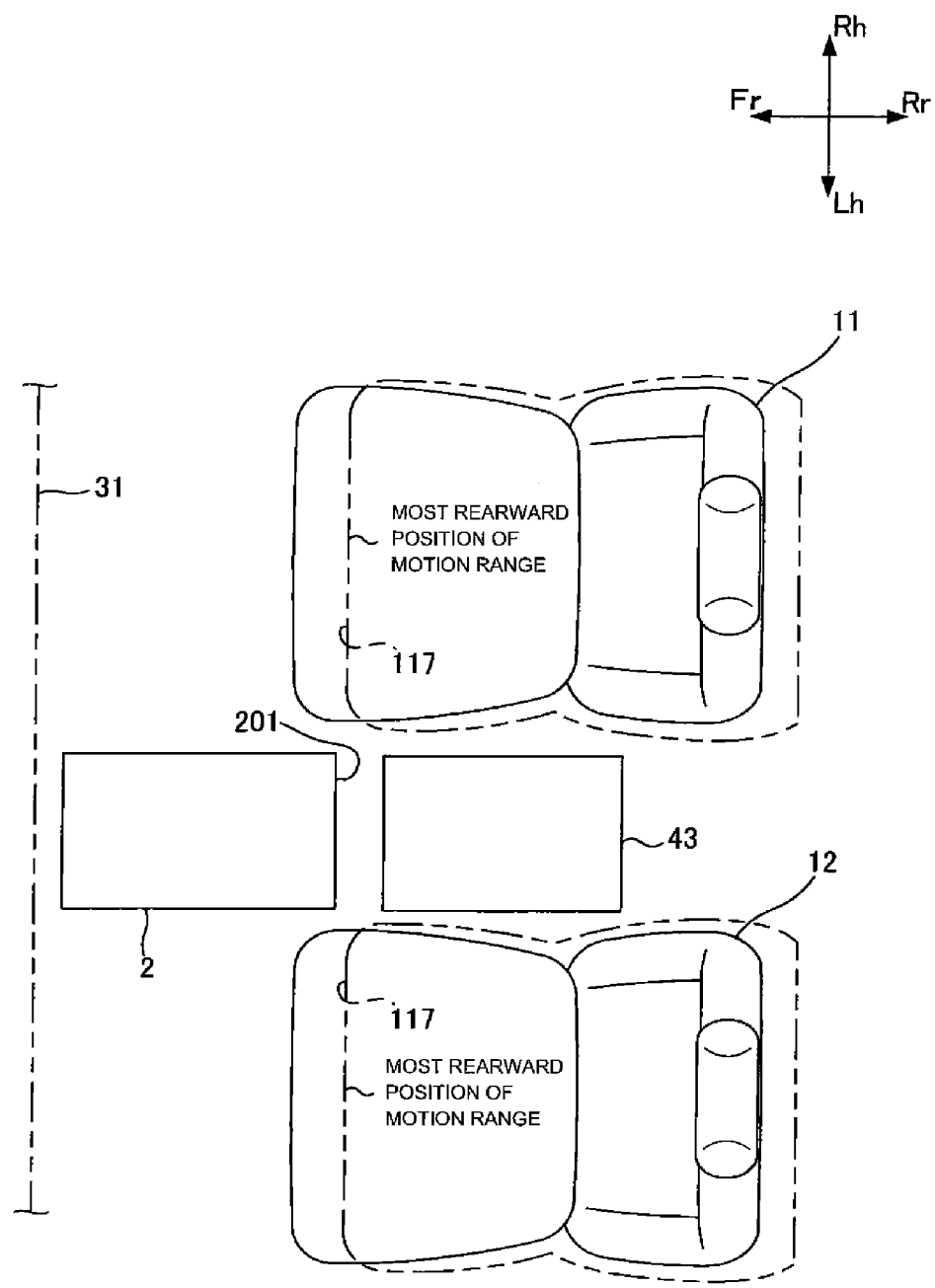
FIG. 3 is a plan view showing the most rearward positions of motion ranges of the driver's seat and a passenger's seat.

FIG. 3 is a plan view showing the most rearward positions of motion ranges of the driver's seat 11 and the passenger's seat 12.

The most rearward position of the motion range of the driver's seat 11 achieved by the slide mechanism 113 is shown by a chain double-dashed line in FIG. 3. The passenger's seat 12 has the same configuration as that of the driver's seat 11 and is movable rearward to the same position as that of the driver's seat 11. As shown in FIG. 2 and FIG. 3, the battery pack 2 is disposed such that its rear end portion 201 is located forward of front end portions 117 of the driver's seat 11 and the passenger's seat 12 located at the most rearward positions of the motion ranges.

Figure 4:
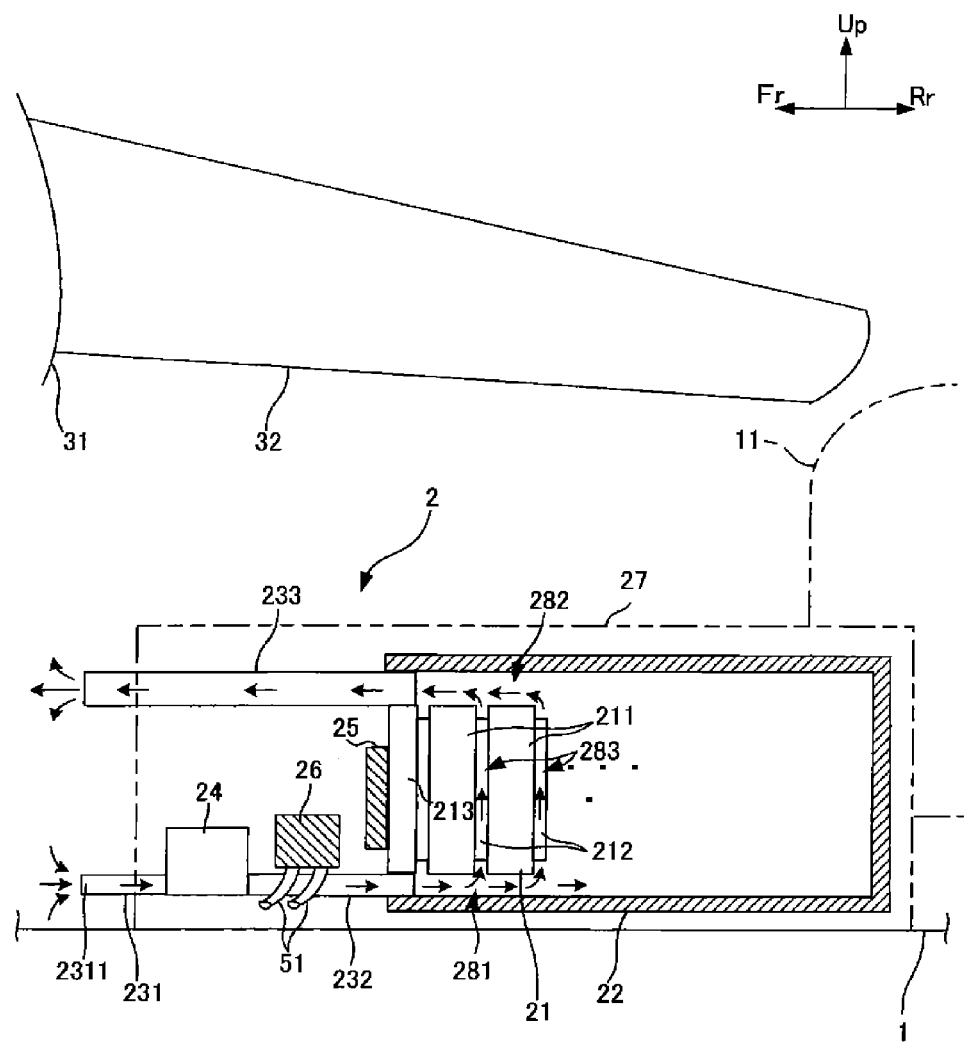
FIG. 4 is a schematic diagram showing the configuration of a battery pack in section and the relationship between the battery pack, an in-pane (instrument panel), a control panel portion, and the driver's seat.

FIG. 4 is a schematic diagram showing the configuration of the battery pack 2 in section and the relationship between the battery pack 2, the in-pane 31, the control panel portion 32, and the driver's seat 11.

The battery pack 2 includes the battery 21, a battery cover 22, intake ducts 231 and 232, an exhaust duct 233, a blower 24, a battery monitoring unit 25, a junction box 26 (connecting portion), and an exterior case 27. The exterior case 27 accommodates the members mentioned above.

The intake duct 231 protrudes forward from the exterior case 27 and connects the outside of the exterior case 27 with the blower 24. An opening portion of the intake duct 231 located outside the exterior case 27 and at a front end of the battery pack 2 is referred to as an intake opening portion 2311. The intake opening portion 2311 is disposed below the in-pane 31 at a position to allow the favorable intake of the low-temperature air sent from the HVAC 41 toward the occupants sitting in the driver's seat 11 and the passenger's seat 12. The intake duct 232 directs the air sent from the blower 24 toward the battery 21.

The exhaust duct 233 connects the inside of the battery cover 22 accommodating the battery 21 with the outside of the exterior case 27. One end of the exhaust duct 233 protrudes to the outside of the exterior case 27 at a position above the intake opening portion 2311. This allows the exhaust duct 233 to let out the air at a raised temperature after the cooling of the battery 21 to a position distant from the occupants.

The battery cover 22 accommodates the battery 21. A lower cooling air path 281 communicating with the intake duct 232 is formed between the bottom of the battery 21 and the battery cover 22. An upper cooling air path 282 communicating with the exhaust duct 233 is formed between the top of the battery 21 and the battery cover 22.

The battery 21 includes a plurality of cells 211 arranged on a straight line, spacers 212 each located between adjacent two of the cells 211, and end plates 213 disposed at positions between which the cells 211 and the spacers 212 are sandwiched. The spacer 212 abuts on the outer faces of the cells 211 to form an inter-cell cooling air path 283 connecting the cooling air paths 281 and 282 between the adjacent cells 211. The cell 211 may be a secondary battery such as a lithium-ion battery or a nickel metal hydride battery, or a capacitor. The cell 211 may be a so-called square-type or cylindrical-type battery. The cell 211 may be a single battery cell or a battery module including a plurality of battery cells connected to each other. The battery cell means a minimum element capable of charge and discharge.

The air sent by the blower 24 to the battery 21 passes through the lower cooling air path 281, the inter-cell cooling air path 283, and the upper cooling air path 282 to cool the battery 21, and then is let out to the outside of the exterior case 27 through the exhaust duct 233.

The junction box 26 is provided in front of the battery 21. The junction box 26 is connected to the power cable 51 connecting the battery 21 to the power control unit 42.

Since the battery pack 2 is disposed forward of the space S2 between the driver's seat 11 and the passenger's seat 12 and rearward of the in-pane 31 in the present embodiment, it is unnecessary to remove the driver's seat 11 and the passenger's seat 12 in removing the battery pack 2 from the vehicle body, and accordingly, the number of man-hours involved in the removal work of the battery pack 2 can be reduced as compared with the conventional battery.

According to the present embodiment, the junction box 26 connected to the power cable 51 is disposed within the battery pack 2 and in front of the battery 21, so that the power cable 51 can be shortened as compared with the case where the junction box 26 is disposed at the back of the battery 21.

According to the present embodiment, the rear end portion 201 of the battery pack 2 is disposed forward of the front end portions 117 of the driver's seat 11 and the passenger's seat 12 located at the most rearward positions of the motion ranges. For removing the battery pack 2 from the vehicle body in the present embodiment, the driver's seat 11 and the passenger's seat 12 can be moved to the most rearward positions of the motion ranges to locate the driver's seat 11 and the passenger's seat 12 at the positions where they are not overlapped with the battery pack 2 when they are viewed from the vehicle width direction. This can facilitate the replacement operation of the battery pack 2.

According to the present embodiment, since the intake opening portion 2311 is disposed at the front end portion of the battery pack 2, the low-temperature air sent from the HVAC 41 to below the in-pane 31 can be favorably taken in to cool the battery 21 sufficiently.

Although the rear-end portion 201 of the battery pack 2 is disposed forward of the front end portions 117 of the driver's seat 11 and the passenger's seat 12 located at the most rearward positions of the motion ranges in the present embodiment, the rear-end portion 201 may be present forward of one of the front end portions 117 and rearward of the other front end portion 117.

Although both the intake position (the position of the protrusion of the intake duct 231 from the exterior case 27) and the exhaust position (the position of the protrusion of the exhaust duct 233 from the exterior case 27) of the battery pack 2 are disposed at the front of the battery pack 2 in the present embodiment, they may be positioned as appropriate. For example, the intake position of the battery pack 2 may be at the back of the battery 21 or on the side of the battery 21. Although the intake position of the battery pack 2 is below the exhaust position in the present embodiment, the intake position may be above the exhaust position.

The embodiment has shown the power control unit 42 as an example of the electric device involved in controlling the power supplied to the load from the battery 21. The electric device may include a discrete converter and a discrete inverter, and can be provided by using an appropriate electric device which controls the power output to the motor, the HVAC, an audio device or the like serving as the load.

The invention claimed is:

1. A vehicle comprising:
   a battery pack disposed forward of a space formed between a driver's seat and a passenger's seat placed side by side in a vehicle width direction, and rearward of an instrument panel provided forward of the driver's seat and the passenger's seat in the interior of the vehicle;
   a center console box disposed rearward of the battery pack in a vehicle front-rear direction, the center console box being disposed side by side in the vehicle width direction between the driver's seat and the passenger's seat, the center console box and the battery pack being disposed side by side in the vehicle front-rear direction;
   a control panel portion extending from the instrument panel to the space formed between the driver's seat and the passenger's seat, the control panel portion being disposed above an upper side of the battery pack which is placed on a floor panel, the control panel portion extending from a front end portion of the battery pack to a rear end portion of the battery pack in the vehicle front-rear direction; and
   a slide mechanism configured to slidably move the driver's seat and the passenger's seat in a front-rear direction of the vehicle and a direction orthogonal to the vehicle width direction, the slide mechanism moving each of the driver's seat and the passenger's seat to a respective most rearward portion of a range of motion in the vehicle front-rear direction, wherein
   the rear end portion of the battery pack, in the vehicle front-rear direction, is disposed rearward of a front end portion of at least one seat of the driver's seat and the passenger's seat in the vehicle front-rear direction when the one seat is not located at the most rearward position of the range of motion, and the rear end portion of the battery pack is disposed forward of the front end portion of at least the one seat when the one seat is located at the most rearward position of the range of motion.

2. The vehicle according to claim 1, wherein the battery pack has an intake opening portion at the front end portion in the vehicle front-rear direction, and the intake opening portion takes in cooling air for cooling the inside of the battery pack into the battery pack.

3. The vehicle according to claim 1, wherein the battery pack accommodates a battery including:
   a plurality of cells connected to each other,
   an electric device controlling a power supplied to a load from the battery that is mounted forward of the instrument panel in the vehicle front-rear direction, and a connecting portion connecting the battery to the electric device being disposed within the battery pack and forward of the battery in the vehicle front-rear direction.

* * * * *